March 10, 1925.
H. F. RICHARDSON
METERING PANEL BOARD
Filed Oct. 27, 1920
1,528,990
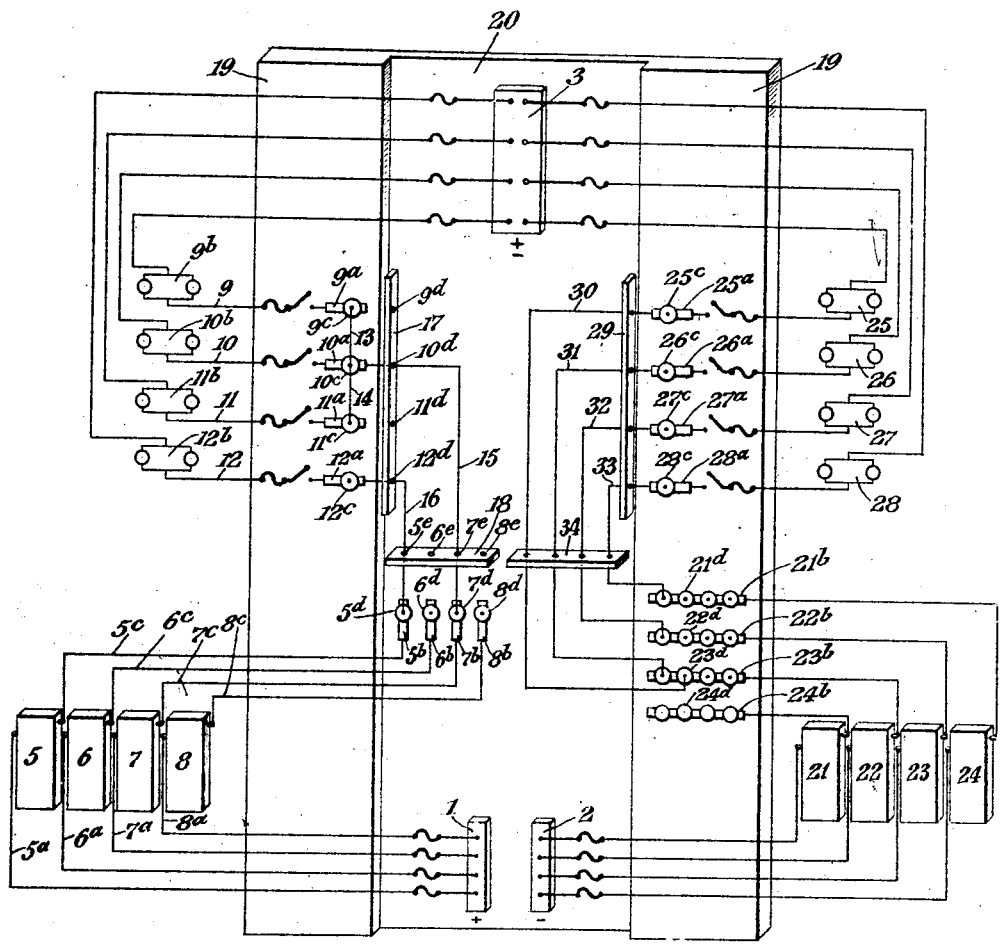
INVENTOR
Henry F. Richardson
BY
Prindle, Wright & Small
ATTORNEYS Patented Mar. 10, 1925.

1,528,990

UNITED STATES PATENT OFFICE.

HENRY F. RICHARDSON, OF BROOKLYN, NEW YORK, ASSIGNOR TO EMMA LOUISE AUTH, OF BROOKLYN, NEW YORK.

METERING PANEL BOARD.

Application filed October 27, 1920. Serial No. 419,978.

*To all whom it may concern:*

Be it known that I, HENRY F. RICHARDSON, a citizen of the United States, residing at 631 Jefferson Avenue, Brooklyn, in the county of Kings and State of New York, have invented a certain new and useful Metering Panel Board, of which the following is a specification.

The invention has for an object to provide a metering panel board of a type wherein a plurality of consumption or service circuits may be selectively connected to the same or different watt-hour-meters of a given installation, which shall require but a minimum number of parts of simple construction to the end that the cost of the same may be as small as possible.

Further objects and advantages of the invention will be in part obvious and in part specifically pointed out in the description hereinafter contained, which, taken in connection with the accompanying drawings, discloses certain preferred embodiments of the invention. Such embodiments, however, are to be considered merely as illustrative of its principle. In the drawings:

Fig. 1 is a somewhat diagrammatic view showing a panel board as adapted and arranged for a three wire system, the positive branch being shown at the left, the negative at the right, and each of such branches containing connections conforming to the invention.

In many installations, for example panel boards employed in large office buildings, it is desirable to shift the meter connections as the tenants change, or as a given tenant occupies a greater or smaller number of rooms, so as to keep each tenant's room in connection with its proper individual meter.

If this result should be accomplished by providing a network of switches or the like, together with the numerous bus bars and other parts incident thereto, with connections or switches for all possible combinations of service and meter circuits which might at any time be desired, the installation may be unduly expensive due to the large amount of copper and other costly equipment required, a large fraction of which would be idle and unnecessary at any given time; furthermore, the intricacy of the panel board might give rise to error in properly cutting in and out the various connections necessary to be shifted when the board is changed.

The present invention therefore aims to provide a panel board in which only as few connection members as possible are employed, and of such simple construction that their cost will be relatively small.

In the single figure of drawings the invention is disclosed in a form suitable for three wire systems, the positive and negative bus bars, 1 and 2 respectively, appearing at the bottom of the figure, and the neutral bus bar 3 at the top. Four meter circuits are illustrated as being included in the positive branch, the meters 5, 6, 7 and 8 having current connections to the positive bar 1 respectively through wires $5^a$, $6^a$, $7^a$ and $8^a$. Meter terminals $5^b$, $6^b$, $7^b$ and $8^b$ are also connected respectively with the above-described meters through wires $5^c$, $6^c$, $7^c$ and $8^c$. Suitable voltage connections (not shown) will be understood as leading to the meters 5, 6, 7 and 8, such connections not being specifically described, as they may be applied in any manner well known to the art.

The positive branch of the system is also shown as including four service lines, 9, 10, 11 and 12, leading respectively from service terminals $9^a$, $10^a$, $11^a$ and $12^a$ through rooms $9^b$, $10^b$, $11^b$ and $12^b$ to the neutral bus bar 3.

If the rooms $9^b$, $10^b$ and $11^b$ are all occupied by one tenant, it will be desired ordinarily to arrange the panel board so that the service lines 9, 10 and 11 are all in circuit with the same meter, for instance meter 7. In order to accomplish this a plurality of connectors are provided adapted to connect the service terminals of a group of rooms desired to be all placed in circuit with the same meter, to a common point which is in circuit with the desired meter. Thus in the example given, connectors 13 and 14 are provided leading from service terminals $9^a$ and $11^a$ respectively to a terminal post $10^c$ mounted on the service terminal $10^a$.

The terminal post $10^c$ is then placed in circuit with meter terminal $7^b$ by means of a connector 15, thus placing each of the rooms $9^b$, $10^b$ and $11^b$ in circuit with meter 7.

In order to make the construction as simple as possible, the connectors 13 and 14 may consist merely of flexible wires leading from the binding post $10^c$ to similar posts $9^c$ and $11^c$ on the service terminals $9^a$ and $11^a$ respectively. The connector 15 may also be a flexible wire secured at one end by the binding post $10^c$ and at the other end by a suitable engaging device $7^d$ on the meter terminal $7^b$, whereby the connector 15 is detachable from the above-mentioned terminal and may be shifted to engage with similar binding posts $5^d$, $6^d$ or $8^d$ on the meter terminals $5^b$, $6^b$ and $8^b$ respectively.

In a like manner, connector 15 may be detachably connected to any of the binding posts $9^c$, $10^c$ or $11^c$, or a similar post $12^c$ on the meter terminal $12^a$, thus permitting any service terminal to be connected to any desired meter terminal. Also connectors, such as members 13 and 14 may be changed to lead from any desired meter terminals to any desired common point in communication with a meter through a connector such as 15, thus enabling the panel board to be changed to correspond to any change in occupancy of the rooms in circuit with the service terminals. In the present instance, room $12^b$ is shown as occupied by a separate tenant so that the service terminal $12^a$ will be connected to a separate meter terminal such as $5^b$ through a flexible connector 16, similar to connector 15 previously described.

A panel board of the above character is exceedingly simple and inexpensive, since the permanent equipment for shifting connections need consist only of the meter and service terminals, the connections being changed by means of flexible connectors which are easy to install or change, and involve only a relatively small cost.

In order to minimize errors in making or shifting connections and to hold them in proper relation to each other, a form strip 17 is preferably interposed between the service terminal $9^a$, etc., and the meter terminal $5^b$, etc., the form strip being provided with recesses $9^d$, $10^d$, $11^d$ and $12^d$ corresponding to the various service terminals, each recess in the present instance being alined with its respective meter terminal. Thus when connectors such as members 15 and 16 are inserted between the service and meter terminals such as members $10^a$ and $7^b$, the connectors will pass through the form strip 17, the latter serving to guide the connectors and facilitate their proper positioning. In the present form, a similar form strip 18 having recesses $5^e$, $6^e$, $7^e$ and $8^e$ is shown as associated with the meter terminals $5^b$, etc., to facilitate proper connections at that end of the connectors. It is preferred to provide the panel board with side walls 19 to carry the service terminals and their associated parts, and to locate the form strip 17 within a gutter 20 between the side walls 19 in such manner that the connectors 15 and 16 are contained within the gutter, so as to provide a compact construction in which all the parts are properly housed.

In the present embodiment, the unitary bus bar 3 also saves some space over a construction having terminals $9^a$, etc., of both polarities on the side wall 19, since the service terminals in the present form, being of the same polarity, may be placed more closely together without violating underwriters' regulations.

In connection with the negative branch of the circuit there is disclosed a system of connections made according to the invention but differing somewhat from the form previously described. Meters 21, 22, 23 and 24 are connected to meter terminals $24^b$, $23^b$, $22^b$ and $21^b$, and rooms 25, 26, 27 and 28 to the service terminals $25^a$, $26^a$, $27^a$ and $28^a$ on the side wall 19 of the panel board, all in the manner previously described in connection with the positive branch of the circuit. In this latter form of the invention, however, the common point in the meter circuit to which a group of service terminals is desired to be connected, is not located on the "service" side of the form strip 29, corresponding to form strip 17 previously described, but on the "meter" side of the same. In the particular construction shown, the meter terminals are each provided with a plurality of engaging devices, whereby a number of connectors may be detachably engaged thereby, thus utilizing a portion of the meter terminal itself as a junction point for the different service terminals desired to be connected with it. As shown, a plurality of binding posts $21^d$, $22^d$, $23^d$ and $24^d$ are mounted on the meter terminals $21^b$, etc., in such manner that connectors 30, 31, 32 and 33, secured at their upper ends to binding posts $25^c$ on the service terminal $25^a$, etc., may be selectively connected to any of the meter terminals $21^b$, etc. In the arrangement illustrated, rooms 25 and 26 are assumed to be occupied by the same tenant, so that connectors 30 and 31 should lead to the binding posts $23^d$ in circuit with meter 22, and rooms 27 and 28 are assumed to be occupied by different tenants, so the connectors 32 and 33 are coupled respectively to meter terminals $21^b$ and $22^b$ to place the last-mentioned rooms respectively in circuit with separate meters 23 and 24. Thus by shifting the detachable connections between connectors 30 to 33 and the meter terminals $21^b$ to $24^b$, any desired meter connections may be provided for the rooms 25 to 28.

A form strip 34, corresponding to form strip 18 previously described, is also shown as associated with negative terminals 21ᵇ to 24ᵇ to serve as a guide for properly connecting the various negative connectors.

While a specific embodiment of the invention has been described, it will be obvious that many changes may be made therein without departing from the spirit of the invention as defined in the appended claims.

I claim:—

1. A metering panel board comprising a plurality of local service terminals, a plurality of local meter terminals each permanently electrically joined to a meter, and spaced at varying distances from said services terminals, a plurality of connector members connected at one end to one of a group of service terminals desired to be connected to the same meter, and all mechanically and electrically connected at the other end to a common junction point electrically joined to the desired meter, said connector members serving to bridge the varying distances between terminals to be connected, said last mentioned connections being detachable, whereby the connector corresponding to any of said service terminals may be shifted to connect with a point electrically joined to any of the meter terminals.

2. A metering panel board comprising a plurality of local service terminals, a plurality of local meter terminals each permanently electrically joined to a meter, and spaced at varying distances from said service terminals, each terminal of said sets being provided with an engaging device whereby a connector may be detachably connected thereto and bodily detachable connectors each detachably connected at one end to the connector engaging device of one of a group of service terminals designed to be connected to the same meter and all detachably connected at the other end to a junction point electrically joined to the desired meter terminal, said connectors serving to bridge the varying distances between terminals to be connected whereby the connector corresponding to any of said service terminals may be shifted to connect with a point electrically joined to any of the meter terminals.

3. A metering panel board comprising a plurality of local service terminals, a plurality of local meter terminals each permanently electrically joined to a meter, and spaced at varying distances from said service terminals, each of said meter terminals being provided with a number of engaging devices whereby a number of connectors may be detachably connected thereto, and connectors each connected at one end to one of a group of service terminals designed to be connected to the same meter, and at the other end to a meter terminal engaging device whereby said service terminals may be connected selectively to the same or different meter terminals, said connectors serving to bridge the varying distances between service and meter terminals to be connected.

4. A metering panel board comprising a plurality of local service terminals, a plurality of local meter terminals each permanently electrically joined to a meter, and spaced at varying distances from said service terminals, each of said service terminals being provided with an engaging device whereby a connector may be detachably connected thereto, and each of said meter terminals being provided with a number of engaging devices whereby a number of connectors may be detachably connected thereto and bodily detachable connectors each connected at one end to a service terminal engaging device, and at the other end to a meter terminal engaging device, whereby said service terminals may be connected selectively to the same or different meter terminals, said connectors serving to bridge the varying distances between service and meter terminals to be connected.

5. A metering panel board comprising a plurality of service terminals, a plurality of meter terminals, a form strip located between said sets of terminals, said form strip having recesses corresponding to the service terminals, a plurality of connector members each mechanically and electrically connected at one end to one of a group of service terminals desired to be connected to the same meter, and all mechanically and electrically connected at the other end to a common junction point electrically joined to the desired meter terminal, said last-mentioned connections being detachable, whereby the connector corresponding to any of said service terminals may be shifted to connect with a point electrically joined to any of the meter terminals, said form strip serving to guide connections from said junction point to the proper terminals which are located on the other side of the form strip.

6. A metering panel board comprising a plurality of service terminals, a plurality of meter terminals, each terminal of said sets being provided with an engaging device whereby a connector may be detachably connected thereto, a form strip located between said sets of terminals, said form strip having recesses corresponding to the service terminals, and a plurality of bodily detachable connectors each detachably connected at one end to a connector engaging device of one of a group of service terminals desired to be connected to the same meter, and all detachably connected, at one side of said form strip, to a common junction point in circuit with the desired meter, said form strip serving to guide connections from said common point to the proper terminals which are located on the other side of the form strip.

7. A metering panel board comprising a plurality of service terminals, a plurality of meter terminals, a form strip located between said sets of terminals, said form strip having recesses corresponding to the service terminals, each terminal of said set of meter terminals being provided with engaging devices whereby a number of connectors may be detachably connected thereto, a plurality of connector members each mechanically and electrically connected at one end to one of a group of service terminals desired to be connected to the same meter terminal, and passing through the proper recesses in said form strip, and all mechanically and electrically detachably connected at the other end to the engaging device of the desired meter terminal, whereby the connector corresponding to any of such service terminals may be shifted to connect with the engaging device of any of the meter terminals.

8. A metering panel board having side walls with a gutter therewithin, a plurality of service terminals located along one of said side walls, a plurality of meter terminals also carried on said board, a form strip located in said gutter and interposed between said sets of terminals, said form strip having recesses substantially alined with the service terminals, and a plurality of connector members each mechanically and electrically connected at one end to one of a group of service terminals desired to be connected to the same meter, and all mechanically and electrically connected at the other end to a common junction point electrically joined to the desired meter terminal, said last-mentioned connections being detachable, whereby the connector corresponding to any of said service terminals may be shifted to connect with a point electrically joined to any of the meter terminals, said form strip serving to guide connections contained in said gutter from said common point to the proper terminals which are located on the other side of the form strip.

9. A metering panel board having side walls with a gutter therewithin, a plurality of service terminals located along one of said side walls, a plurality of meter terminals also carried by the said board, each terminal of said sets of terminals being provided with an engaging device whereby a connector may be detachably connected thereto, a form strip located in said gutter and having recesses substantially alined with the service terminals, and a plurality of bodily detachable connectors each connected at one end to the connector engaging device of one of a group of service terminals desired to be connected to the same meter, and all detachably connected at their other end at one side of said form strip to a common junction point electrically joined to the desired terminal, said form strip serving to guide connections contained in said gutter from said common point to the proper terminals which are located on the other side of the form strip.

10. A metering panel board having side walls with a gutter therewithin, a plurality of service terminals located along one of said side walls, a form strip located in said gutter and having recesses substantially alined with the service terminals, a plurality of meter terminals located on the other side of the form strip and each having engaging devices whereby a number of connectors may be detachably connected thereto, and a plurality of connectors each connected at one end to one of a group of service terminals desired to be connected to the same meter, and all passing through the proper recesses of said form strip and detachably connected at the other end to the engaging device of the desired meter terminal.

11. A metering panel board adapted for three wire systems, having walls with a gutter located therebetween, positive and negative service terminals respectively located on opposite side walls, a plurality of meter terminals also carried by said board, a common neutral bus bar for the positive and negative branches of the system located apart from said positive and negative sets of terminals, and a plurality of connector members each mechanically and electrically connected at one end to one of a group of service terminals desired to be connected to the same meter, and all mechanically and electrically connected at the other end to a common junction point electrically joined to the desired metering panel, said last mentioned connections being detachable, whereby the connector corresponding to any of said service terminals may be shifted to connect with a point electrically joined to any of the meter terminals.

12. A meter paneling board adapted for three wire systems, having side walls with a gutter located therebetween, positive and negative service terminals respectively located on opposite side walls, a plurality of meter terminals also carried by said board, a common neutral bus bar for the positive and negative branches of the system located apart from said positive and negative sets of terminals, and a plurality of connector members each mechanically and electrically connected at one end to one of a group of service terminals desired to be connected to the same meter, and all mechanically and electrically connected at the other and to a common junction point electrically joined to the desired metering panel, whereby the connector corresponding to any of said service terminals may be shifted to connect with a point electrically joined to any of the meter terminals, and form strips located in said gutter and respectively having recesses substantially alined with the positive and negative service terminals, said form strips serving respectively to guide connections contained in said gutter from said common point to the proper terminals which are located on the other side of the form strip.

In testimony that I claim the foregoing, I have hereunto set my hand this 25th day of October, 1920.

HENRY F. RICHARDSON.